United States Patent
Weifenbach

(10) Patent No.: US 10,676,195 B2
(45) Date of Patent: Jun. 9, 2020

(54) SPACE-OPTIMIZED PASSENGER SEAT ARRANGEMENT FOR A VEHICLE CABIN

(71) Applicant: AIRBUS OPERATIONS GMBH, Hamburg (DE)

(72) Inventor: Jörg Weifenbach, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 15/724,129

(22) Filed: Oct. 3, 2017

(65) Prior Publication Data
US 2018/0022458 A1    Jan. 25, 2018

Related U.S. Application Data

(63) Continuation of application No. PCT/EP2016/057725, filed on Apr. 8, 2016.

(30) Foreign Application Priority Data

Apr. 10, 2015  (DE) .................. 10 2015 105 540

(51) Int. Cl.
*B64D 11/06*   (2006.01)

(52) U.S. Cl.
CPC ............... *B64D 11/0601* (2014.12)

(58) Field of Classification Search
CPC .................................. B64D 11/0601
See application file for complete search history.

(56) References Cited

U.S. PATENT DOCUMENTS

| 1,743,149 | A | * | 1/1930 | Lyford | B62D 47/02 296/64 |
| 4,382,628 | A | | 5/1983 | Palmgren | |
| 4,936,620 | A | * | 6/1990 | Francois | B64D 11/00 105/345 |
| 7,780,115 | B2 | * | 8/2010 | Watanabe | B60N 2/01 244/118.6 |

(Continued)

FOREIGN PATENT DOCUMENTS

| DE | 4116524 A1 | 11/1992 |
| DE | 102012003713 A1 | 11/1992 |

(Continued)

OTHER PUBLICATIONS

International Searching Authority, International Search Report for International Application No. PCT/EP2016/057725 dated Jul. 11, 2016.

*Primary Examiner* — Brian M O'Hara
*Assistant Examiner* — Keith L Dixon
(74) *Attorney, Agent, or Firm* — Lorenz & Kopf LLP

(57) ABSTRACT

A passenger seat arrangement for a vehicle cabin includes at least one first group of passenger seats with a first passenger seat and a second passenger seat, at least one third passenger seat, and an aisle extending parallel to a longitudinal axis. The first passenger seat or the third passenger seat is arranged directly adjacent to the aisle and with a seating direction extending parallel thereto. A seating direction of the second passenger seat is rotated relative to the seating direction of the first passenger seat by a first angle of at least 2°, and the first group of passenger seats and the third passenger seat are arranged adjacent to one another and have a longitudinal offset along the longitudinal axis.

8 Claims, 2 Drawing Sheets

(56) References Cited

U.S. PATENT DOCUMENTS

| | | | |
|---|---|---|---|
| 9,126,689 B2* | 9/2015 | Porter | B60N 2/01 |
| 9,889,936 B2* | 2/2018 | Campbell | B64D 11/06 |
| 2006/0192050 A1 | 8/2006 | Cheung et al. | |
| 2008/0042010 A1 | 2/2008 | Watanabe | |
| 2012/0223186 A1* | 9/2012 | Henshaw | B64D 11/06 |
| | | | 244/118.6 |
| 2013/0106156 A1 | 5/2013 | Orson et al. | |
| 2014/0117727 A1 | 5/2014 | Campbell et al. | |
| 2014/0283296 A1 | 9/2014 | Jerome et al. | |
| 2017/0327232 A1* | 11/2017 | Morgan | B64D 11/0646 |
| 2018/0029712 A1* | 2/2018 | Sieben | B64D 11/0601 |
| 2018/0029713 A1* | 2/2018 | Weifenbach | B64D 11/0601 |

FOREIGN PATENT DOCUMENTS

| | | | |
|---|---|---|---|
| DE | 60212191 T2 | 4/2007 | |
| DE | 102008044712 A1 | 3/2010 | |
| EP | 1314643 A1 | 5/2003 | |
| WO | 2011141134 A1 | 11/2011 | |
| WO | 2014049362 A1 | 4/2014 | |
| WO | WO-2016162413 A1 * | 10/2016 | B64D 11/0601 |

\* cited by examiner

SPACE-OPTIMIZED PASSENGER SEAT ARRANGEMENT FOR A VEHICLE CABIN

CROSS-REFERENCE TO PRIORITY APPLICATIONS

This application is a continuation of international patent application number PCT/EP2016/057725, having an international filing date of Apr. 8, 2016, which claims priority to German patent application number 102015105540.6, having a filing date of Apr. 10, 2015. The content of the referenced applications is incorporated by reference herein.

TECHNICAL FIELD

Embodiments of the invention pertain to a passenger seat arrangement for a vehicle cabin and to a vehicle that comprises a cabin with a floor and a passenger seat arrangement positioned thereon.

BACKGROUND

The operating efficiency of vehicles and, in particular, aircraft is highly dependent on the number of installed passenger seats. It is known to increase the number of passenger seats installed in an aircraft fuselage with fixed outside dimensions by respectively miniaturizing or compacting cabin monuments and/or by reducing the seat spacing or the thickness of seat components. However, this is only possible to a certain degree without substantially restricting the comfort for passengers.

For example, German patent document DE 10 2012 003 713 A1 describes a particularly narrow and space-saving toilet module comprising a toilet unit with a longitudinal axis that includes an angle greater than 0° with a sidewall.

It is also known to provide passenger seat arrangements with offset and rotated seats in order to improve the comfort for passengers. Such an arrangement is disclosed, for example, in European patent document EP 1 314 643 A2.

BRIEF SUMMARY

An object of the disclosure therefore may be seen in proposing a passenger seat arrangement for a cabin of a vehicle, particularly an aircraft, which not only makes it possible to accommodate a greater number of passenger seats, but also to improve the comfort in the cabin.

This object is met by way of a passenger seat arrangement with the characteristics of independent claim 1. Advantageous embodiments and further improvements are disclosed in the dependent claims and the following description.

A passenger seat arrangement for a vehicle cabin is proposed, comprising at least a first group of passenger seats with a first passenger seat and a second passenger seat, at least a third passenger seat and an aisle extending parallel to a longitudinal axis, wherein the first or the third passenger seat is arranged directly adjacent to the aisle and with a seating direction extending parallel thereto, wherein a seating direction of the second passenger seat is rotated relative to the seating direction of the first passenger seat by a first angle of at least 2°, and wherein the first group of passenger seats and the third passenger seat are arranged adjacent to one another and longitudinally offset relative to one another along the longitudinal axis.

This passenger seat arrangement consequently defines a row that comprises, in particular, three seats and is arranged adjacent to a longitudinally extending aisle in the cabin and preferably extends from this aisle to an outer cabin wall. The passenger seat arrangement may be a supplement to passenger seats located in a region between two parallel aisles. The passenger seat arrangement may furthermore also be arranged on two sides of the aisle, preferably mirror-symmetrical about a mirror axis formed by the longitudinal axis of the aisle.

The third passenger seat and the first group of passenger seats are arranged adjacent to one another and longitudinally offset relative to one another. The third passenger seat therefore is arranged in a different position along the longitudinal axis than the first group of passenger seats, wherein the longitudinal offset may shift the third passenger seat into a position that lies farther forward, as well as into a position that lies farther rearward referred to a viewing direction extending parallel to the longitudinal axis. In the passenger seat arrangement, the first group or the third passenger seat may be arranged adjacent to the aisle. When using a plurality of first groups and third passenger seats, in which first groups are preferably directly arranged behind one another and third passenger seats likewise directly follow one another, a zigzag structure of sorts may result along the region, over which the passenger seat arrangement extends. For the sake of completeness, it is noted that the designations of the passenger seats as "first," "second" and "third" should not be interpreted as a sequence, but merely serve for clearly distinguishing the individual passenger seats.

The first group contains two passenger seats that slightly face one another due to a rotation of at least one passenger seat, preferably at least one passenger seat that is not arranged directly adjacent to an aisle, by at least 2°. This rotation refers to a rotation of the corresponding passenger seat about a vertical axis that extends vertically to a floor, on which the passenger seat arrangement is positioned. The specified angle furthermore refers to an inclination of one passenger seat relative to the other passenger seat of the first group or the passenger seat arranged adjacent to the aisle, respectively. In this case, the starting point of the rotation is assumed to be an arrangement of two passenger seats that are positioned directly adjacent and parallel to one another, in which a backrest of the passenger seat to be rotated is arranged flush on a backrest of the other passenger seat. During the course of the rotation by at least 2°, the backrest of the passenger seat to be rotated is slightly spaced apart farther from the backrest of the other passenger seat, wherein the relative motion of the backrests is smaller than that of the distant front edges of the associated seating surfaces. In this context, a seating direction refers to the viewing direction of a passenger, who is sitting up completely straight on the respective passenger seat.

Due to the rotation of a passenger seat in the first group relative to another passenger seat on the one hand and due to the longitudinal offset relative to the third passenger seat on the other hand, a particularly advantageous passenger seat structure may be realized in the cabin because all passenger seats provide adequate shoulder room. The slight rotation would also make it possible to place a region of a backrest of the rotated passenger seat, which comes in contact with a shoulder of a passenger, behind a region of a backrest of an outer passenger seat, which likewise comes in contact with a shoulder of a passenger. In this way, the available space for the passenger seat arrangement in the lateral direction may be utilized better than the conventional arrangements, in which the passenger seats are exclusively arranged parallel to one another. In fact, it may even be possible to widen the adjacent aisle without restricting the legroom and without having to increase the width of the cabin. A passenger seat adjacent to the aisle is preferably shifted in the longitudinal direction.

Since a passenger seat arranged adjacent to the aisle is aligned parallel to the aisle, the aisle is altogether distinguished from the passenger seat arrangement in a more distinct fashion. The risk of cabin personnel, cabin trolleys and the like bumping against shoulders or knees of passengers seated on the passenger seats adjacent to the aisles is thereby lowered.

The disclosed passenger seat arrangement therefore not only allows an improved utilization of space in the longitudinal direction, but also in the lateral direction of the cabin. The passenger seat arrangement is altogether very advantageous for the creation of a space-efficient and comfortable passenger cabin, in which no modifications with respect to a conventional seat spacing or a miniaturization or compaction of monuments is required.

In order to realize such a passenger seat arrangement, it may be necessary to manufacture correspondingly adapted seat frames, but these seat frames would be respectively limited, for example, to a first group of two passenger seats or the third passenger seat. In this case, the longitudinal offset between the two groups remains freely adjustable if seat rails or other fastening means in the cabin make it possible to do so. It would alternatively and preferably also be possible to realize an arrangement of the first group and the third passenger seat in or on a single seat frame, in which case the longitudinal offset would be predefined.

In an advantageous embodiment, the longitudinal offset may amount to less than half of the depth of a passenger seat. In this context, the depth refers to the extent of the seating surface of the corresponding passenger seat in the longitudinal direction, i.e. along the corresponding seating direction. In this way, sufficient spatial decoupling is achieved between the shoulders of passengers on all passenger seats and, in particular, on the second and the third passenger seat. However, a greater longitudinal offset would make it more difficult to move from the aisle to passenger seats that are positioned farther outward or to hand meals to such passenger seats. When the passenger seat arrangement for the respective cabin is designed, it therefore has to be pondered which longitudinal offset is actually required in order to achieve the shoulder room on the one hand and convenient access to outer passenger seats on the other hand.

In an advantageous embodiment, the first group and the third passenger seat have a lateral offset corresponding to no more than one fourth of the width of a passenger seat in a lateral axis, which extends perpendicular to the longitudinal axis and lies in a plane of the passenger seat arrangement. A passenger seat could have a clear width of 18 inches between armrests, which is supplemented by two armrests with a width, for example, of 2 inches.

Alternatively, the widths of the passenger seats could be slightly reduced in order to achieve wider aisle.

The first angle preferably amounts to no more than 9°. The above-described special technical effect of the embodiment does not require very large rotational angles of the inner passenger seats because the rotation is particularly intended to create shoulder room. An excessive rotation would also lead to significant widening of each group of passenger seats such that the inventive effect would be at least partially canceled. It proved particularly advantageous to choose the angle from a range of 3° to 6°.

In addition, the longitudinal offset may be chosen from a range of 4 to 7 inches or about 10.2 cm to 17.8 cm, particularly 5 inches to 6 inches or about 12.7 cm to 15.2 cm. Due to this longitudinal offset, which clearly lies below the depth of a passenger seat, the passage between two groups of passenger seats lying behind one another is not blocked by a third passenger seat and a passenger may without effort reach an outer, third passenger seat from an aisle between two groups of two passenger seats or, if a reversed arrangement is desired, reach the first group of passenger seats between two third passenger seats in lying behind one another.

The passenger seat arrangement may furthermore comprise several first groups and third passenger seats that are arranged directly behind one another and respectively spaced apart by a seat clearance.

The seat clearance may lie in a range between 75 and 90 cm, wherein a seat clearance of 32 inches (81.3 cm) may particularly be used.

The disclosure furthermore pertains to a vehicle that comprises a cabin with a floor and a passenger seat arrangement positioned thereon. This passenger seat arrangement may be realized, in particular, in the form of an elongated lateral section within a cabin.

The vehicle may ultimately comprise at least one additional group of passenger seats that is arranged on the side of the aisle facing away from the above-described inventive passenger seat arrangement. This additional group of passenger seats is then realized in the form of a central or an additional lateral section.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of exemplary embodiments and the figures. In this respect, all described and/or graphically illustrated characteristics form the object of the disclosure individually and in arbitrary combination, namely regardless of their composition in the individual claims or their references to other claims. In the figures, identical or similar objects are furthermore identified by the same reference symbols.

DETAILED DESCRIPTION

Figure 1:
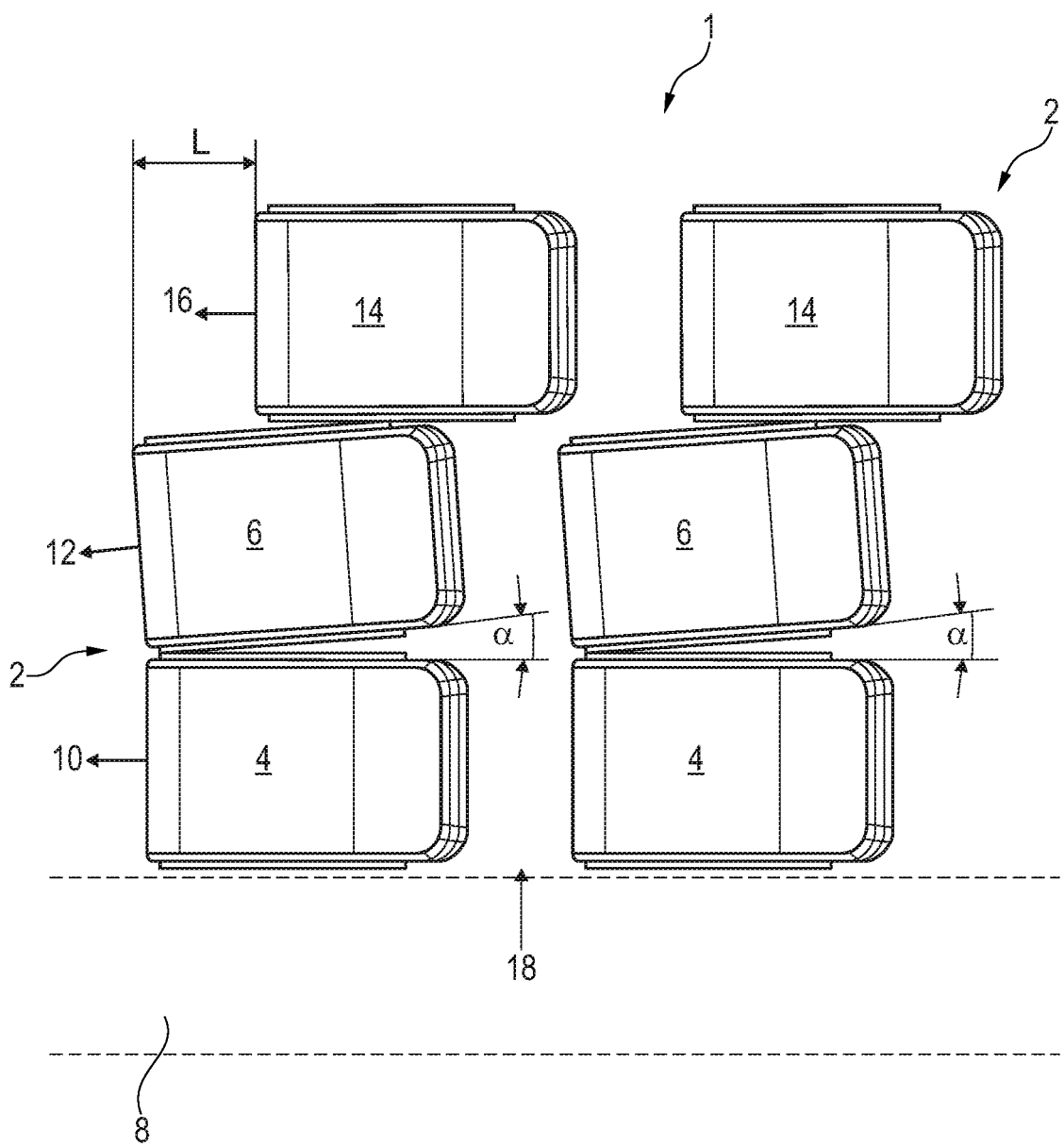
FIG. 1 shows a first exemplary embodiment of a passenger seat arrangement in the form of a top view.

FIG. 1 shows a first exemplary embodiment of a passenger seat arrangement 1 with a first group 2, which includes a first passenger seat 4 and a second passenger seat 6 and is arranged adjacent to an aisle 8. The first passenger seat 4 is arranged parallel to the direction of the aisle 8 and has a first seating direction 10 that extends parallel to the aisle 8. The second passenger seat 6 is rotated relative to the first passenger seat 4 by an angle α in such a way that a second seating direction 12 of the second passenger seat 6 is slightly rotated toward the aisle 8. In this example, the chosen angle α is 3°, which provides sufficient shoulder room on the first and the second passenger seat 4, 6.

In this example, a third passenger seat 14 is arranged adjacent to the first passenger seat 6 farther from the aisle 8 and aligned parallel to the aisle 8 and the first passenger seat 4. Consequently, its seating direction 16 extends parallel to the seating direction 10 of the first passenger seat 4. The group 2 and the third passenger seat 14 have a longitudinal offset L amounting, for example, to 5 to 6 inches. In this way, the third passenger seat 14 is decoupled from the second passenger seat 6 to such an extent that sufficient shoulder room is ensured on both passenger seats 6 and 14.

FIG. 1 furthermore shows that several first groups 2 and third passenger seats 14 may be arranged behind one another, wherein a passage 18 between two groups 2 lying behind one another is not restricted due to the relatively small longitudinal offset L. A third passenger seat 14 may always be easily reached from the aisle 8.

Figure 2:
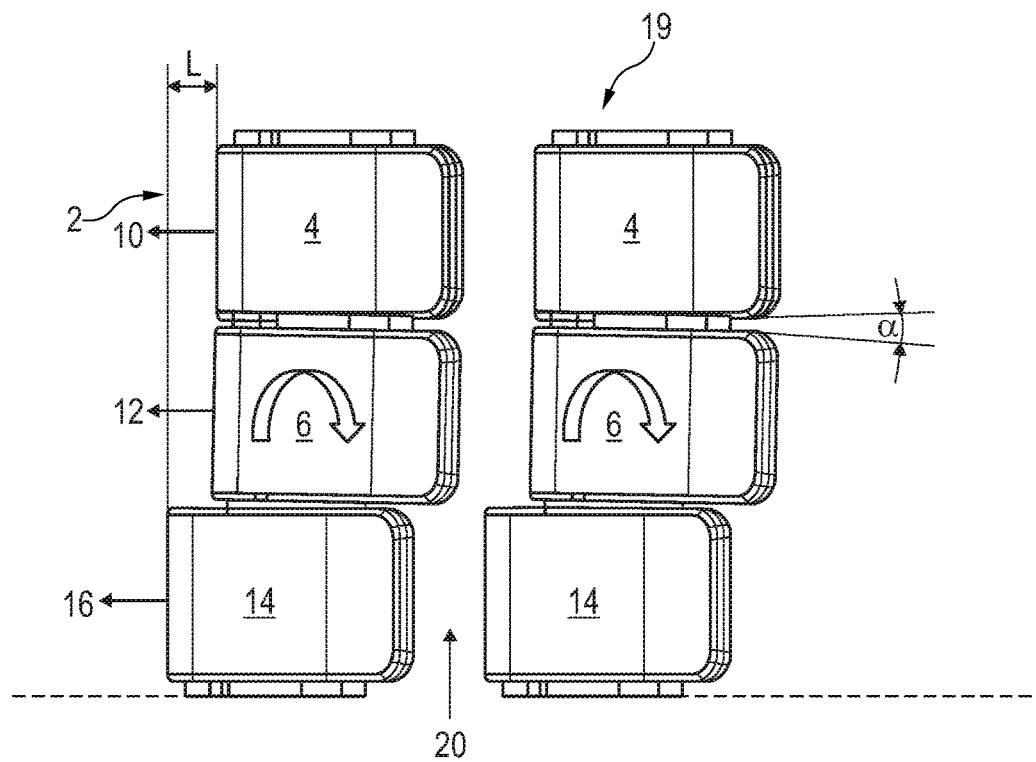
FIG. 2 shows a second exemplary embodiment of a passenger seat arrangement in the form of a top view.

An alternative embodiment of a passenger seat arrangement 19 is illustrated in FIG. 2, in which the positions of the first group 2 and the third passenger seat 14 are interchanged in comparison with FIG. 1. This means that the third passenger seat 14 is arranged directly adjacent to the aisle 8 and has a longitudinal offset L in the longitudinal direction such that a passage 20 is created and may be very easily reached from the aisle 8 between two third passenger seats lying behind one another. This makes it possible, in particular, to conveniently hand meals to the outer first passenger seat 4, especially without disturbing the passenger in the second passenger seat 6.

Figure 3:
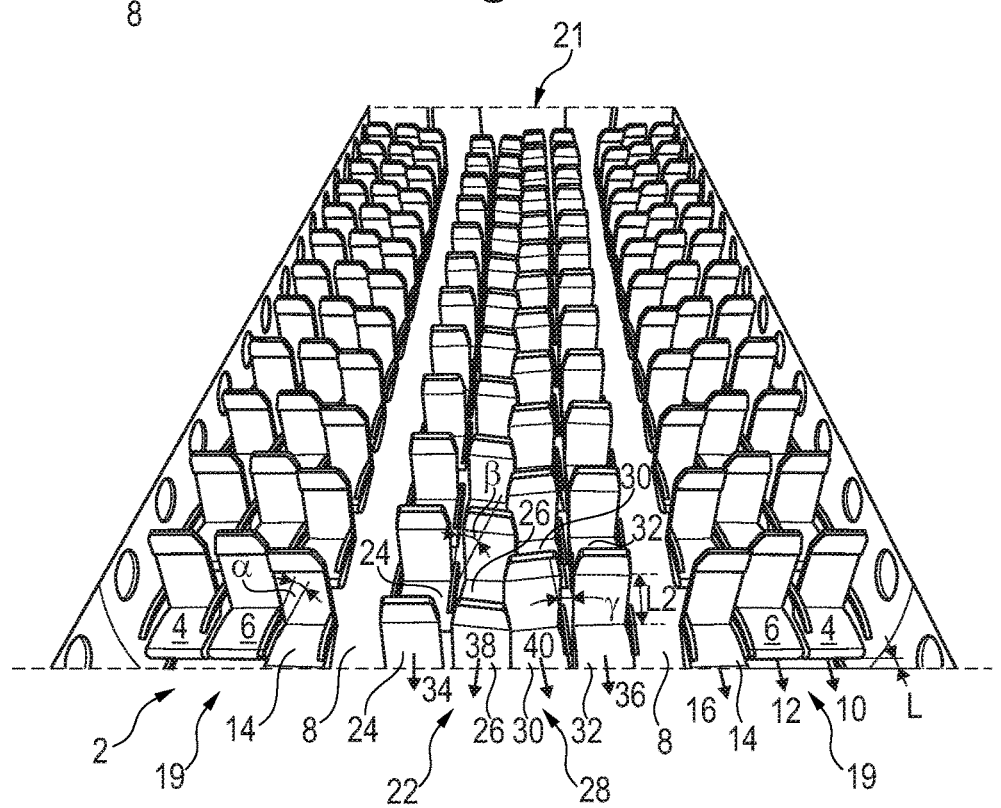
FIG. 3 shows a perspective view of a cabin with a passenger seat arrangement that is supplemented with additional passenger seats.

FIG. 3 ultimately shows a perspective view of a passenger seat arrangement 19 according to FIG. 2 arranged on two sides of a passenger cabin in a mirror-inverted fashion. Two aisles 8 are illustrated in this example and enclose another passenger seat arrangement 21 in a central region of the cabin. In the example shown, aisles 8 with a comfortable width, as well as a total of ten seats per row, are achieved due to the very good compaction in the lateral direction.

The passenger arrangement 21 comprises second groups 22 of passenger seats with a fourth passenger seat 24 and a fifth passenger seat 26 and third groups 28 with a sixth passenger seat 30 and a seventh passenger seat 32. The fourth passenger seat 24 is arranged directly adjacent to an aisle 8 and with a seating direction 34 extending parallel thereto. The seventh passenger seat 32 is likewise arranged directly adjacent to the other aisle 8 and with a seating direction 36 extending parallel thereto. A seating direction 38 of the fifth passenger seat 26 is rotated relative to the seating direction 34 of the fourth passenger seat 24 by a second angle β of at least 2° and a seating direction 40 of the sixth passenger seat 30 is rotated relative to the seating direction 36 of the seventh passenger seat 32 by a third angle γ of at least 2°.

The second group 22 and the third group 28 are respectively arranged adjacent to one another and have a longitudinal offset L2 along the longitudinal axis. This allows a lateral offset that in turn makes it possible to widen the aisles 8 without restricting the comfort for the passengers. The longitudinal offset L2 furthermore amounts to no more than one and a half times the depth of a passenger seat.

As a supplement, it should be noted that "comprising" does not exclude any other elements or steps, and that "a" or "an" does not exclude a plurality. It should furthermore be noted that characteristics or steps that were described with reference to one of the above exemplary embodiments may also be used in combination with other characteristics or steps of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A passenger seat arrangement for a vehicle cabin, the passenger seat arrangement comprising:
   an aisle extending along a longitudinal axis;
   a first passenger seat arranged directly adjacent to the aisle, the first passenger seat having a first seating direction extending parallel to the longitudinal axis of the aisle;
   a second passenger seat arranged directly adjacent to the first passenger seat such that the first passenger seat is located between the aisle and the second passenger seat, the second passenger seat having a second seating direction that is rotated toward the aisle, rotated relative to the first seating direction of the first passenger seat, and rotated relative to the longitudinal axis of the aisle, by an angle of at least 2°; and
   a third passenger seat arranged directly adjacent to the second passenger seat such that the second passenger seat is located between the first passenger seat and the third passenger seat, the third passenger seat having a third seating direction extending parallel to the longitudinal axis of the aisle and extending parallel to the first seating direction of the first passenger seat;
   wherein the first passenger seat, the second passenger seat, and the third passenger seat are arranged on a common side of the aisle; and
   wherein the third passenger seat is longitudinally offset rearward, relative to the first passenger seat and the second passenger seat, along the longitudinal axis of the aisle.

2. The passenger seat arrangement of claim 1, wherein the longitudinal offset amounts to less than half of the depth of a passenger seat.

3. The passenger seat arrangement of claim 1, wherein the angle amounts to no more than 9°.

4. The passenger seat arrangement of claim 3, wherein the angle is within a range of 3° to 6°.

5. The passenger seat arrangement of claim 1, wherein the longitudinal offset is within a range of 4 to 7 inches.

6. The passenger seat arrangement of claim 1, wherein the first passenger seat, the second passenger seat, and the third passenger seat define a row of seats, and wherein the passenger seat arrangement comprises several instances of the row of seats, the several instances of the row of seats arranged directly behind one another and respectively spaced apart by a seat clearance.

7. The passenger seat arrangement of claim 6, wherein the seat clearance is within a range between 75 and 90 cm.

8. A vehicle comprising:
   a cabin with a floor; and
   a passenger seat arrangement positioned on the floor, the passenger seat arrangement comprising:
   an aisle extending along a longitudinal axis;

a first passenger seat arranged directly adjacent to the aisle, the first passenger seat having a first seating direction extending parallel to the longitudinal axis of the aisle;

a second passenger seat arranged directly adjacent to the first passenger seat such that the first passenger seat is located between the aisle and the second passenger seat, the second passenger seat having a second seating direction that is rotated toward the aisle, rotated relative to the first seating direction of the first passenger seat, and rotated relative to the longitudinal axis of the aisle, by an angle of at least 2°; and a third passenger seat arranged directly adjacent to the second passenger seat such that the second passenger seat is located between the first passenger seat and the third passenger seat, the third passenger seat having a third seating direction extending parallel to the longitudinal axis of the aisle and extending parallel to the first seating direction of the first passenger seat;

wherein the first passenger seat, the second passenger seat, and the third passenger seat are arranged on a common side of the aisle; and wherein the third passenger seat is longitudinally offset rearward, relative to the first passenger seat and the second passenger seat, along the longitudinal axis of the aisle.

* * * * *